United States Patent [19]

Hope et al.

[11] 4,312,470

[45] Jan. 26, 1982

[54] APPARATUS FOR PROCESSING PHOTOGRAPHIC MATERIALS

[76] Inventors: Henry F. Hope; Stephen F. Hope, both of 2421 Wyandotte Rd., Willow Grove, Pa. 19090

[21] Appl. No.: 158,260

[22] Filed: Jun. 10, 1980

[51] Int. Cl.³ .................... B65H 17/22; G03B 1/56; G03D 3/08

[52] U.S. Cl. .................... 226/183; 226/92; 226/189; 354/321

[58] Field of Search .................... 226/183, 188, 189, 91, 226/92; 354/319–322, 312, 314, 316, 339; 74/421 R

[56] References Cited

U.S. PATENT DOCUMENTS

| | | | |
|---|---|---|---|
| 3,025,779 | 3/1962 | Russell | 95/94 |
| 3,067,919 | 12/1962 | Kunz | 226/188 |
| 3,072,310 | 1/1963 | Kunz | 226/188 |
| 3,147,090 | 9/1964 | Russell | 34/160 |
| 3,345,928 | 10/1967 | Krehbiel | 95/94 |
| 3,532,048 | 10/1970 | Hope | 95/94 |
| 3,656,676 | 4/1972 | Hope | 226/92 |
| 3,922,702 | 11/1975 | Gaskell | 354/321 |
| 3,952,610 | 4/1976 | Hope | 74/421 R |
| 3,989,176 | 11/1976 | Hope | 226/189 |
| 4,026,451 | 5/1977 | Hope | 226/91 |
| 4,079,635 | 3/1978 | Hope | 74/421 R |
| 4,118,998 | 10/1978 | Hope | 74/421 R |

*Primary Examiner*—Edward J. McCarthy
*Attorney, Agent, or Firm*—Z. T. Wobensmith, 2nd; Z. T. Wobensmith, III

[57] ABSTRACT

Apparatus for processing photographic materials is disclosed and more specifically equipment for turn-around during processing of an elongated web of photographic material at the midportion of a processing operation, the web being guided in part by inner and outer rollers but having vibrating guides interposed between pairs of rollers, the guides being oscillated by the drive for the rollers. Various types of oscillating mechanism for the guides is shown.

16 Claims, 11 Drawing Figures

APPARATUS FOR PROCESSING PHOTOGRAPHIC MATERIALS

BACKGROUND OF THE INVENTION

1. Field of the Invention

This invention relates to apparatus for processing photographic materials.

2. Background of the Prior Art

It has heretofore been proposed to provide roller transport apparatus for processing photographic materials in web form in tanks containing chemicals in solution and washing liquid, and in which the web is moved downwardly in the tank, then at or near the bottom of the tank is turned and moved upwardly for delivery to another tank or for drying. One of the problems which has been encountered is in the turnaround at the bottom of the tank.

It has been proposed, as part of the turnaround apparatus, to provide fixed guide plates or shoes, as shown in the U.S. Patents to Kunz, No. 3,072,310; Hope et al., Nos. 3,532,048, 3,656,676 and 3,952,610. Such guide plates are usually ribbed or corrugated and have a tendency to scratch or streak the web being processed.

It has also been proposed, as part of the turnaround apparatus to guide the web with rollers as shown in the U.S. Patents to Kunz, No. 3,067,919; Russell et al., Nos., 3,025,779 and 3,147,090; Krehbiel, No. 3,345,928; Hope et al., Nos. 3,952,610, 3,989,176, 4,026,451, 4,079,635 and 4,118,998. With the use of such guide rollers it is important that the centers of the shafts be properly located to provide a smooth advance of the web with avoidance of scratching of the web. A wide radius is required to accommodate the guide rollers with consequent lack of compactness. The use of nip rollers is troublesome because of the difficulty in maintaining constant pressure on the web to avoid slipping because of insufficient pressure and to avoid pinching and bruising which can occur with excessive pressure.

SUMMARY OF THE INVENTION

In accordance with the invention the turnaround apparatus includes guide rollers for engaging the web and interposed oscillating or vibrating guides which upon contact with a leading edge facilitate the advance of that edge and the web which follows.

It is the principal object of the invention to provide improved apparatus for processing photographic material in web form and more specifically the turnaround at the bottom of the processing tank by the use of oscillating or vibrating guides which aid in the advance of the web.

It is a further object of the invention to provide improved apparatus for processing photographic material in web form by the use of oscillating or vibrating guides which are operated from the driving mechanism of the rollers which deliver the web to the turnaround and advance it therefrom.

It is a further object of the invention to provide apparatus of the character aforesaid with which improved handling of the web is effected.

It is a further object of the invention to provide a turnaround for web processing with which the likelihood of damage to the web during processing is greatly reduced.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which.

Figures 1, 4, 5:
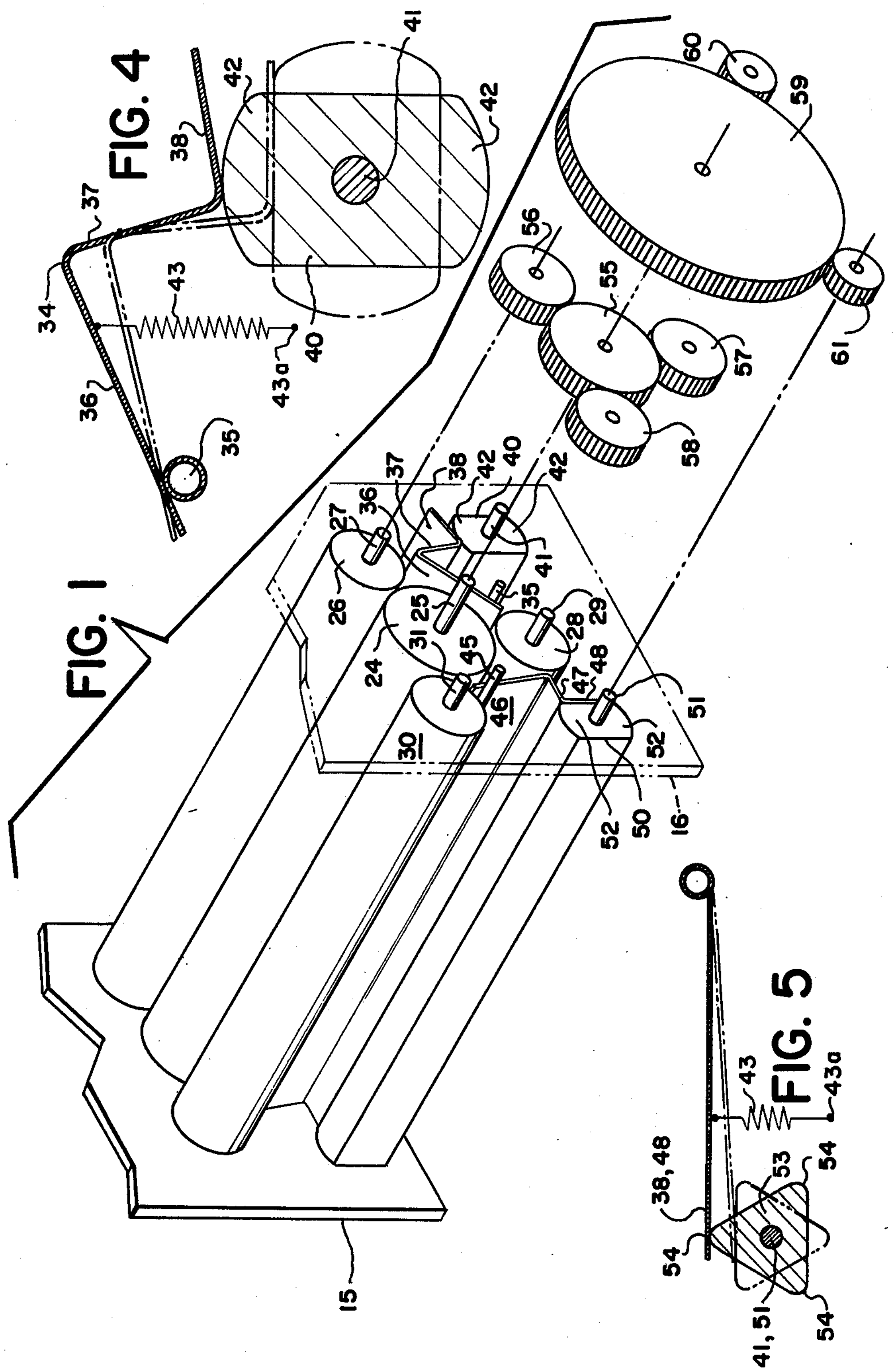
FIG. 1 is a view in perspective of one embodiment of web processing apparatus in accordance with the invention with the driving gears moved outwardly with respect to one of the side frame plates in the interest of clarity.
FIG. 4 is a fragmentary vertical sectional view, enlarged, showing the movement of the guide plate of FIGS. 1, 2 and 3.
FIG. 5 is an end elevational view of a different cam shape which can be employed for actuation of the movable guide.
Figure 2:
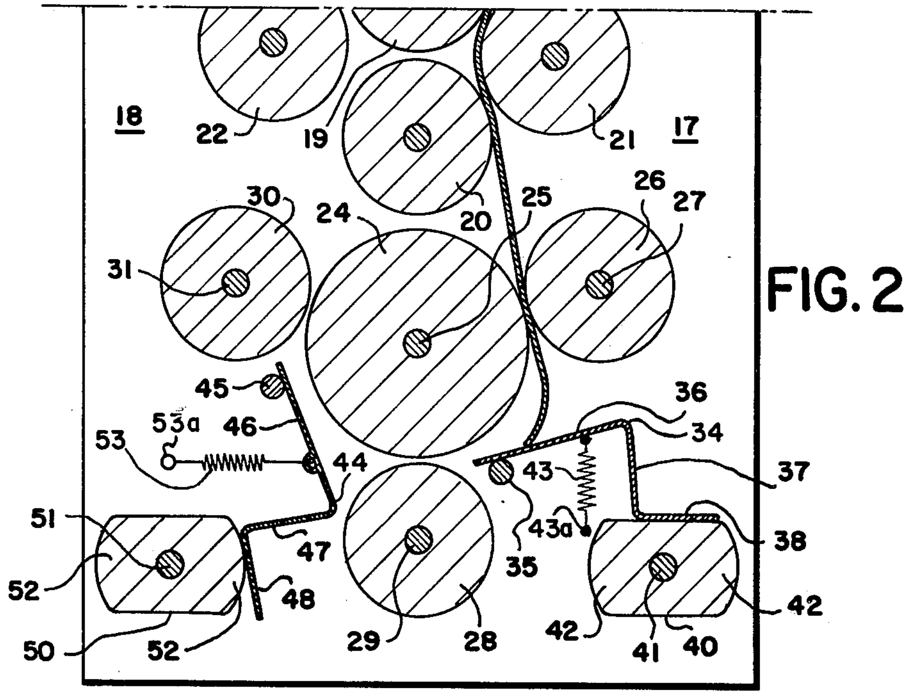
FIG. 2 is a vertical sectional view of the apparatus of FIG. 1 of the present invention in one of its operation positions.
Figure 3:
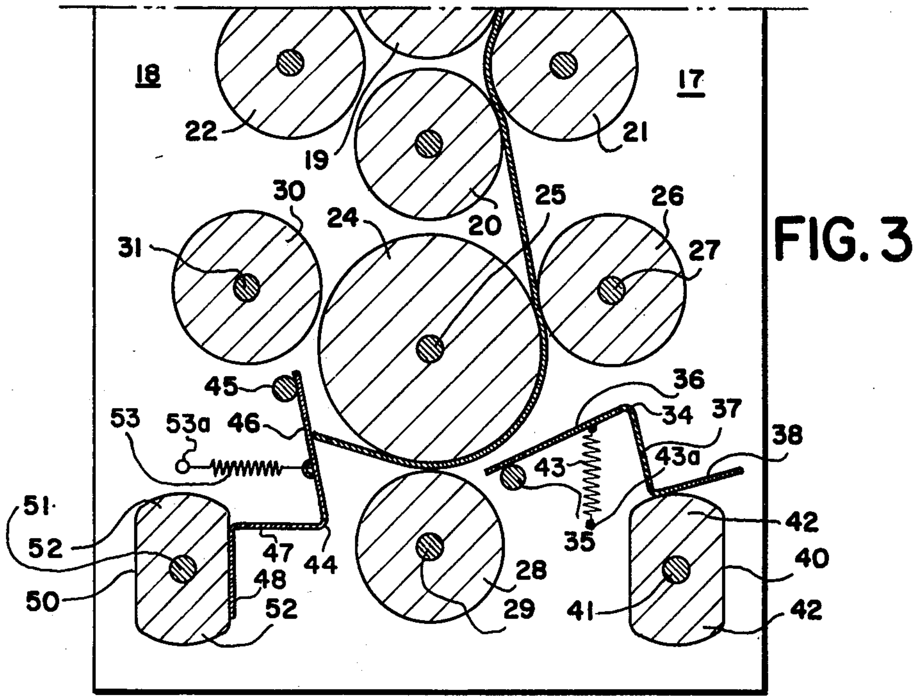
FIG. 3 is a view similar to FIG. 2 with the apparatus in another of its operation positions.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to FIGS. 1 to 5 of the drawings, end frames 15 and 16 are shown, of any suitable material, incuding metal or plastic, of sufficient strength and resistant to the chemicals and liquids to which they are exposed in use. The bearings and bushings employed in the end frames 15 and 16 have been omitted in the interest of clarity.

The end frames 15 and 16 are held in assembled and spaced relation in a well known manner by frame rods (not shown). The downfeed and upfeed sections of the roller transport for the web can be of well known type such as those shown in our prior U.S. Pat. Nos. 3,952,610, 4,026,451, 4,079,635 and 4,118,998. Fragmentary portions of the downfeed section 17 and upfeed section 18 are shown on FIGS. 2 and 3 as central rollers 19 and 20 rotating clockwise, a downfeed roller 21 and an upfeed roller 22 contiguous to the central rollers 19 and 20.

The turnaround at the lower part of the end frames 15 and 16 and immediately below the downfeed rollers 19, 20 and 21 and the upfeed rollers 19, 20 and 22, preferably includes a central roller 24 on a shaft 25 rotatably supported in the end frames 15 and 16 with a contiguous downfeed roller 26 on a shaft 27 carried by the end frames 15 and 16 with its center above that of the shaft 25, a contiguous turnaround roller 28 on a shaft 29 below the roller 24 and carried by the end frames 15 and 16, and a contiguous upfeed roller 30 on a shaft 31 carried by the end frames 15 and 16 with its center above that of the shaft 25.

In order to receive the end of a web of photographic material from the rollers 25 and 26, a web guide 34 is provided extending between the end frames 15 and 16 and carried by a pivotally mounted shaft 35 supported in the end frames 15 and 16. The web guide 34 has a web guide plate 36, an integral connecting plate 37 and an actuating plate 38. The actuating plate 38 has a cam 40 in engagement therewith carried on a shaft 41 shown in FIGS. 1, 2, 3 and 4 as having two lobes or risers 42. A spring 43, carried on a post 43*a* and connected to the plate 36 from each of the plates 15 and 16 may be used to keep the actuating plate 38 in contact with the cam 40 although the weight of the web guide 34 may serve the same purpose.

In order to advance the web from the rollers 24 and 28, a web guide 44, similar to the web guide 34, is preferably provided extending between and movable between the end frames 15 and 16, carried by a pivotally mounted shaft 45 supported in the end frames 15 and 16. The web guide 44 has a web guide plate 46, an integral connecting plate 47 and an actuating plate 48. The actuating plate 48 has a cam 50 in engagement therewith carried on a shaft 51 which is shown in FIGS. 1, 2, 3 and 4 as having two lobes or risers 52. A spring 53 carried on a post 53*a* on the inner faces of the plates 15 and 16 and connected to the plate 46 may be used to keep the actuating plate 48 in contact with the cam 50.

In FIG. 5, a cam 53 which can be carried on the shafts 41 and 51 is shown which has three lobes or risers 54 to obtain increased oscillations of the web guides 34 and 44.

In order to actuate the turnaround the shafts 25, 27, 29 and 31 have gears 55, 56, 57 and 58 secured thereto, the gears 56, 57 and 58 meshing with the gear 55, and which can be driven in any desired manner from or through the downfeed section 17 or the upfeed section 18 or both. The shaft 25 also has a gear 59 secured thereto with which gears 60 and 61 are in engagement. The gears 60 and 61 are secured to the shafts 41 and 51 in driving relation.

In the embodiment of the invention shown in FIGS. 1, 2, 3 and 4, the web delivered by the rollers 20 and 21 of the downfeed section 17 is advanced by the rollers 24 and 26 to contact the guide plate 36 of the web guide 34. The guide plate 36 is oscillated about its pivot 35 by rotation of the cam 40, driven by the shaft 41 at a rate corresponding to one cycle of oscillation for each one sixteenth to one eighth of an inch of the advance of the web, the maximum movement of the right hand end of the plate 36 (FIG. 1) being of the order of one eighth to three thirty seconds of an inch. The movement of the plate 36, which is immersed in the agitated liquid in the tank in which the turnaround is located initially causes the free end of an advancing web to be deflected toward the left with continued advance of the remainder of the web by engagement between the rollers 24 and 28.

As the web is thus advanced the free end of the web is advanced toward the guide plate 46 of the web guide 44 but with liquid between the web and the guide plate 40. The guide plate 46 is oscillated about its pivot 45 by rotation of the cam 50, driven by the shaft 51 at the same rate and with the same maximum movement as the guide plate 36. The movement of the plate 46, as before, in the liquid in the tank in which the turnaround is located initially causes the free end of the web to be deflected upwardly with continued advance of the remainder of the web by engagement between the rollers 24 and 30 upwardly for further advance by upfeed section 22.

Figures 6, 9:
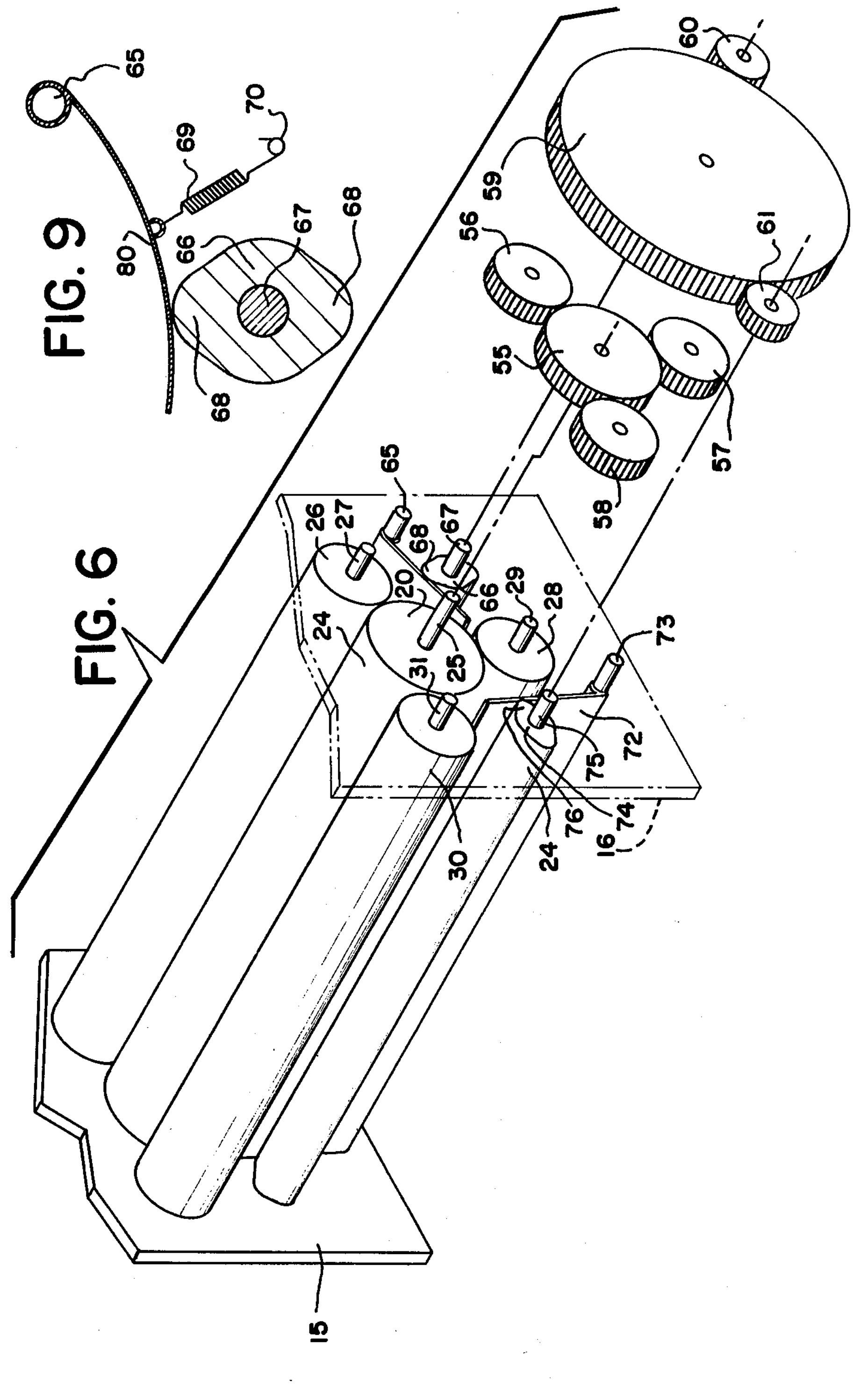
FIG. 6 is a view similar to FIG. 1 but showing a different guide plates.
FIG. 9 is a side elevational view showing a different profile for the guide plate.
Figure 7:
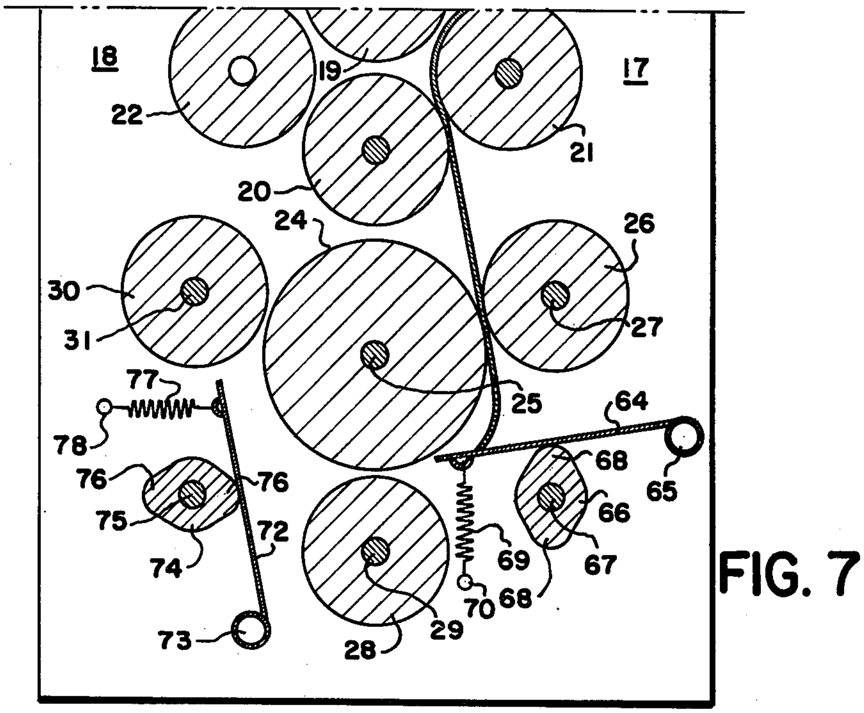
FIG. 7 is an end elevational view of the apparatus of FIG. 6 of the present invention in one of its operating positions.
Figure 8:
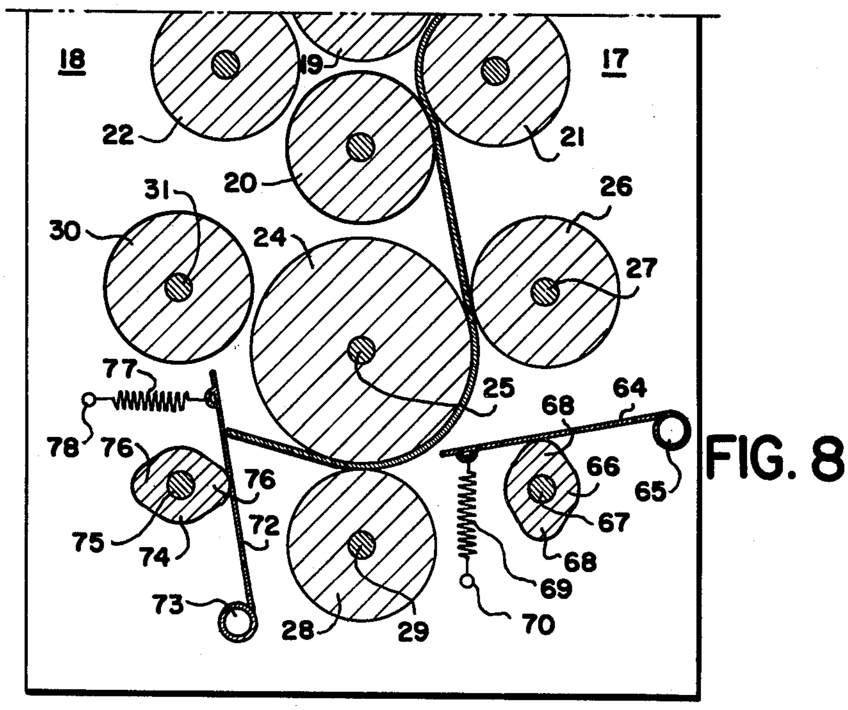
FIG. 8 is a view similar to FIG. 7 with the apparatus in another of its operating positions.

Referring now to FIGS. 6, 7 and 8 another embodiment of the invention is there illustrated. The downfeed section 17 and upfeed section 18 with their rollers 19, 20, 21 and 22, are provided as previously explained, together with turnaround rollers 24, 26 and 30, driven by shafts 25, 27 and 31.

In this embodiment of the invention a guide plate 64 is provided secured to a pivotally mounted shaft 65 carried by the end frames 15 and 16.

In order to oscillate the guide plate 65, a cam 66 is secured to a drive shaft 67. The cam 66 is shown as having two lobes or risers 69, like the cam 40, and is driven, as previously described by a gear 59 secured to the shaft 29 and by a gear 60 which drives the shaft 67. A spring 69 similar to the spring 43 can also be employed connected to the guide plate 65 and carried on posts 70 on the interior faces of the end frames 15 and 16.

A web guide plate 72 is provided secured to a pivotally mounted shaft 73 carried by the end frames 15 and 16.

In order to oscillate the web guide plate 72, a cam 74 is secured to a drive shaft 75. The cam 74 is shown as having two lobes or risers 76, like the cam 40 and is driven, as previously described, by a gear 59 secured to the shaft 29, and by a gear 61 which drives the shaft 75. A spring 77 similar to the spring 69 is preferably employed, connected to the guide plate 72 and carried on posts 78 on the inner faces of the end frames 15 and 16.

While the guide plates 64 and 72 are shown as flat, in FIG. 9 a curved plate 80 is shown which can also be employed.

If desired, a cam 53 such as that shown in FIG. 5 can be employed.

The operation of the web guide plates 64 and 72 is similar to that previously described for FIGS. 1 to 4, inclusive.

Figure 10:
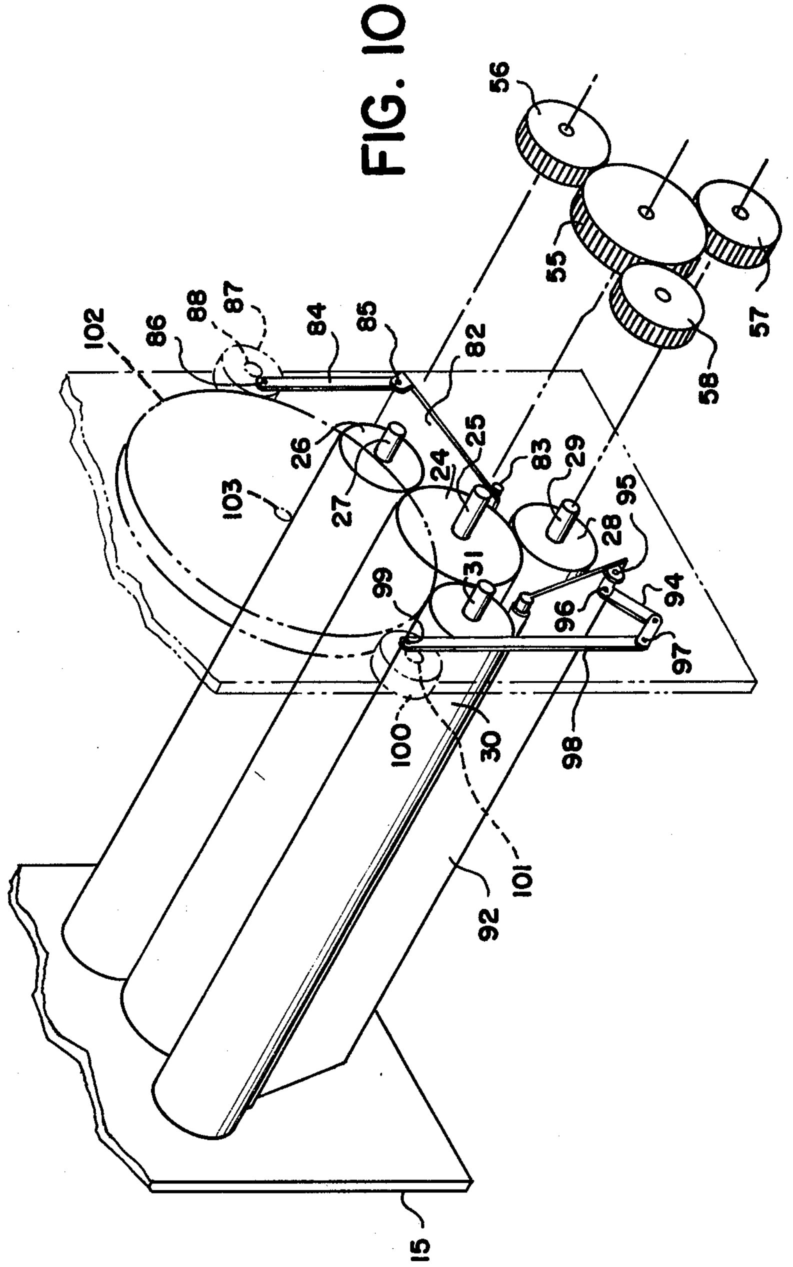
FIG. 10 is a view similar to FIG. 1 but showing a different guide plate and its actuation.
Figure 11:
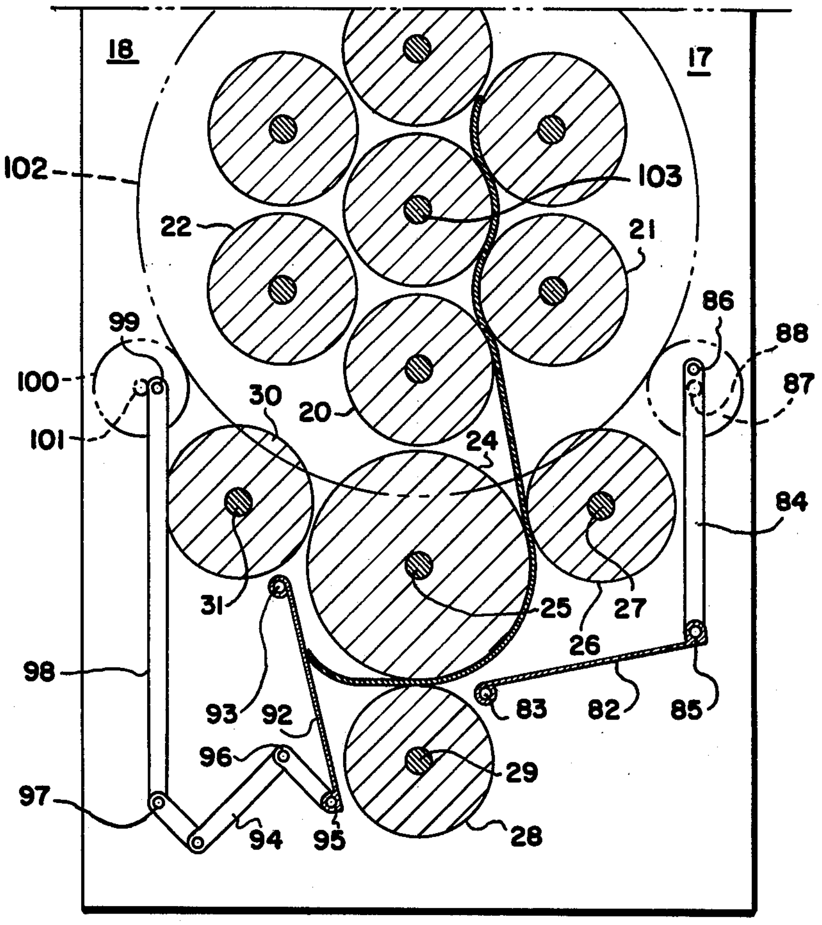
FIG. 11 is a vertical sectional view of the apparatus of FIG. 10.

In the embodiment of the invention illustrated in FIGS. 10 and 11 of the drawings a different form of oscillating structure is employed. The downfeed section 17 and upfeed section 18 with their rollers 19, 20, 21 and 22 are provided as previously explained together with turnaround rollers 24, 26 and 30, driven by shafts 25, 27 and 31.

In this embodiment a guide plate 82 is provided secured to a pivotally mounted shaft 83 carried by the end frames 15 and 16.

In order to oscillate the web guide plate 82 a link 84 is provided, pivotally connected by a pivot pin 85 to each end of the plate 82 at the opposite edge from that at which the shaft 83 supports the guide plate 82. The link 84 is pivotally connected to a crank pin 86 on a gear 87 carried by a shaft 88 thru each of the plates 15 and 16 which meshes with a gear 89 on a shaft 90 which forms part of the drive for the downfeed section 17 and upfeed section 18.

The turnaround, as before, includes a central roller 24 on a shaft 25, a downfeed roller 26 on a shaft 27, the rollers 24 and 26 feeding the web downwardly, a bottom roller 28 on a shaft 29 and a roller 30 on a shaft 31, driven as before by gear 56 on shaft 27 meshing with gear 55, gear 57 on shaft 29, meshing with gear 55 and gear 58 on shaft 31 meshing with gear 55. The web guide plate 82 receives the web from the rollers 24 and 26 and by its movement initiates movement of the end of the web toward the space between the rollers 24 and 29, and continues to aid in the advance of the end of the web and of the web itself by its oscillation.

A web guide plate 92 is provided, pivotally supported at one edge by a shaft 93 carried by the end frames 15 and 16 and which has a bell crank 94 pivotally connected to the guide plate 92 by pivots 95. The bell crank 94 is supported by a pivot pin 96 and has a pivotal connection 97 to a link 98 which is connected to a crank pin 99 on a gear 100. A gear 100 is carried on shafts 101 on each of the inner faces of the end frames 15 and 16 and meshes with the gear 89.

The web guide plate 92 by its oscillating movement and with liquid between the web and the guide plate 92 directs the end of a web and continues to aid in the advance of the web from the guide rolls 24 and 28 to the guide rolls 24 and 30.

The oscillatory movement of the web guide plates 82 and 92 is preferably of substantially the same amplitude and at substantially the same frequency as previously pointed out.

The gears 87 and 100 are driven in any desired manner, one suitable drive being by a gear 102 carried on a shaft 103 which may be part of the downfeed section 17, the upfeed section 18 or both.

The advance of the leading end of the web and the continued advance of the web, in the agitated liquid in the treating tank, is facilitated by the oscillatory web guides previously described, with a minimum of interference with the advance and the avoidance of engagement with the web which tends to pinch the web or which does not properly advance the web without scratching or streaking.

We claim:

1. In apparatus for processing photographic materials by conveying an elongated web for turnaround in a confined space comprising
- spaced frame members,
- means carried by said spaced frame members for directing the web in an arcuate path,
- said means comprising web guide plates for engagement by the web mounted for oscillatory movement, and
- members for oscillating said web guide plates.

2. Apparatus as defined in claim 1 in which
said web guide plates have therealong pivotally mounted support members.

3. Apparatus as defined in claim 2 in which
said members for oscillating said web guide plates comprise cams.

4. Apparatus as defined in claim 2 in which
said members for oscillating said web guide plates comprise cranks.

5. In apparatus for processing photographic material by conveying an elongated web for turnaround in a confined space comprising
- spaced frame members,
- a plurality of web engaging rollers rotatably supported by said frame members,
- said rollers comprising a central roller and feed rollers parallel thereto and spaced around a portion of the periphery of said central roller for web engagement,
- web guide members interposed between said feed rollers, and
- means for oscillating said web guide members for advancing a web therealong and successively from engagement by one of said feed rollers to another of said feed rollers.

6. Apparatus as defined in claim 5 in which
driving means is provided for said feed rollers.

7. Apparatus as defined in claim 5 in which
driving means is provided for said central roller.

8. Apparatus as defined in claim 5 in which
driving means is provided for simultaneously driving said feed rollers and said central roller.

9. Apparatus as defined in claim 5 in which
at least one of said web guide members is pivotally mounted at one edge, and
said means for oscillating said web guide member comprises a cam.

10. Apparatus as defined in claim 9 in which
said means for oscillating said web guide member is a multiple lobed cam.

11. Apparatus as defined in claim 9 in which
said means for oscillating said web guide member is a crank.

12. Apparatus as defined in claim 9 in which
resilient means is provided for retaining said guide members in engagement with said cam.

13. Apparatus as defined in claim 5 in which
one of said web guide members is substantially flat.

14. Apparatus as defined in claim 5 in which
one of said web guide members is curved.

15. Apparatus as defined in claim 5 in which
one of said web guide members is substantially horizontally disposed contiguous to a downfeed location of the web.

16. Apparatus as defined in claim 5 in which
one of said web guide members is substantially vertically disposed contiguous to an upfeed location of said web.

* * * * *